United States Patent
Leeder et al.

(10) Patent No.: US 8,036,211 B1
(45) Date of Patent: Oct. 11, 2011

(54) LEGACY USER PROXY CALL SESSION CONTROL FUNCTION

(75) Inventors: Michael Leeder, Stittsville (CA); Douglas Nielsen, Napean (CA)

(73) Assignee: GenBand US LLC, Plano, TX (US)

( * ) Notice: Subject to any disclaimer, the term of this patent is extended or adjusted under 35 U.S.C. 154(b) by 1963 days.

(21) Appl. No.: 10/983,498

(22) Filed: Nov. 8, 2004

Related U.S. Application Data

(60) Provisional application No. 60/551,458, filed on Mar. 9, 2004.

(51) Int. Cl.
*H04L 12/66* (2006.01)
(52) U.S. Cl. ........ 370/353; 370/354; 370/355; 370/356; 455/435.1; 455/445; 709/223; 709/225
(58) Field of Classification Search ................. 370/352, 370/471, 392, 229
See application file for complete search history.

(56) References Cited

U.S. PATENT DOCUMENTS

| | | | |
|---|---|---|---|
| 2003/0224722 A1* | 12/2003 | Martin et al. | 455/11.1 |
| 2004/0043793 A1* | 3/2004 | Sakata | 455/560 |
| 2004/0156394 A1* | 8/2004 | Westman | 370/471 |
| 2004/0179092 A1* | 9/2004 | LaPoint | 348/14.08 |
| 2004/0249887 A1* | 12/2004 | Garcia-Martin et al. | 709/204 |
| 2005/0025047 A1* | 2/2005 | Bodin et al. | 370/229 |
| 2005/0071455 A1* | 3/2005 | Collins | 709/223 |
| 2005/0083909 A1* | 4/2005 | Kuusinen et al. | 370/352 |
| 2005/0286531 A1* | 12/2005 | Tuohino et al. | 370/395.2 |

* cited by examiner

*Primary Examiner* — Fan Tsang
*Assistant Examiner* — Simon King
(74) *Attorney, Agent, or Firm* — Anderson Gorecki & Manaras LLP

(57) ABSTRACT

A Legacy User Proxy CSCF ("L-CSCF") provides multimedia services from a SIP based network to legacy access networks and devices. The L-CSCF includes a legacy service control state machine; a P-CSCF state machine and associated protocols; a mapping between a user's legacy network address and a corresponding network entry point; a database and logic for mapping between legacy user addresses and corresponding authentication data; legacy specific QoS control mechanisms; and an interworking function to handle incompatibilities between the legacy and SIP call models. The L-CSCF may be disposed logically between the legacy network and the multimedia network to translate and process communications such that legacy network and multimedia network devices need not require extensive modifications in order to support operation.

10 Claims, 8 Drawing Sheets

LEGACY USER PROXY CALL SESSION CONTROL FUNCTION

CROSS-REFERENCE TO RELATED APPLICATIONS

A claim of priority is made to U.S. Provisional Patent Application Ser. No. 60/551,458 entitled Legacy User Proxy CSCF Call Session Control Function, filed Mar. 9, 2004.

FIELD OF THE INVENTION

This invention is generally related to multimedia services, and more particularly to provision of multimedia services to legacy access networks.

BACKGROUND OF THE INVENTION

Wireless communications such as the General Packet Radio Service/Universal Mobile Telecommunications System ("GPRS/UMTS") and 1X Radio Transmission Technology/Code Division Multiple Access ("1XRTT/CDMA") markets are evolving to enable multimedia services by converging on a common Session Initiation Protocol ("SIP") based architecture such as those specified in the Third Generation Partnership Project ("3GPP") IP Multimedia Subsystem ("IMS") and 3GPP2 Multimedia Domain ("MMD") standards initiatives. Although some differences exist between IMS and MMD, they are both based on a SIP signaling infrastructure with a Call Session Control Function ("CSCF") node within the signaling and service control infrastructure as illustrated in FIG. 1. A Home Subscriber Server ("HSS") 20 functions as a repository for user profiles, service subscription profiles, user identities and authentication data. A Serving CSCF ("S-CSCF") 22 manages sessions and service control on behalf of a user based on user generated requests and user profile data stored in the HSS 20. An Interrogation CSCF ("I-CSCF") 24 provides a defined entry point into the SIP signaling network, and enables SIP interconnection over operator network boundaries. A Proxy CSCF ("P-CSCF") 26 functions as the user's SIP entry point into the SIP signaling network. The P-CSCF 26 is responsible for managing any access specific functions, such as data encryption, Quality of Service ("QoS") control, and compression such that access details are not visible within the core CSCF network. The multimedia services are provided by application servers. The services are invoked from the S-CSCF 22 via an Intelligent Service Control ("ISC") SIP-based interface 28.

Limited interworking with legacy service components is provided by gateways between the IMS protocols and the native legacy protocols. For example, an IMS Service Switching Function ("SSF") 30 implements a virtual Intelligent Network ("IN") SSF function, as well as an IP Multimedia Service Control ("ISC")/SSF interworking function. This enables an IMS subscriber to invoke legacy Service Control Point ("SCP") based services 32, such as Virtual Private Network ("VPN") and Prepaid. A Media Gateway Control Function ("MGCF") 34 and Media Gateway ("MGW") 36 provide interworking between IMS based Voice over IP ("VoIP") infrastructures 38 and legacy Public Switched Telephone Network ("PSTN") networks 40. This enables an IMS based user to place a telephone call to a PSTN based subscriber.

One limitation of these SIP based architectures is that users must gain access using a specific multimedia device, e.g., IMS enabled device, over a suitable packet based access type, e.g., UMTS packet network, WLAN, etc. Consequently, non-IMS users are unable to invoke services that are integrated within the IMS.

SUMMARY OF THE INVENTION

In accordance with the present invention, a Legacy User Proxy CSCF ("L-CSCF") facilitates provision of multimedia and multimedia-like services via legacy access networks and devices. The L-CSCF includes a legacy service control state machine; a P-CSCF state machine and associated protocols; a mapping between a user's legacy network address and a corresponding network entry point; a database and logic for mapping between legacy user addresses and corresponding authentication data; legacy specific QoS control mechanisms; and an interworking function to handle incompatibilities between the legacy and SIP call models. The L-CSCF may be disposed logically between the legacy network and the multimedia network to translate and process communications such that legacy network and multimedia network devices need not require extensive modifications in order to support operation.

The L-CSCF can advantageously be implemented in various embodiments having utility with regard to various legacy technologies. For example, the L-CSCF may be implemented as an Intelligent Network (IN) Proxy CSCF (IN P-CSCF), VoIP Softswitch Proxy CSCF (Softswitch L-CSCF), Parlay Proxy CSCF (Parlay L-CSCF), OSA Proxy CSCF (OSA L-CSCF), TAPI Proxy CSCF (TAPI L-CSCF), Q.931 Proxy CSCF (PRI L_CSCF), UNISTIM Proxy CSCF (UNI L_CSCF), and other embodiments that will be apparent to those skilled in the art.

The invention advantageously enables users to gain access using a legacy device over a legacy network. Consequently, non-IMS users are able to invoke at least some services that are integrated with or implemented within the IMS.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
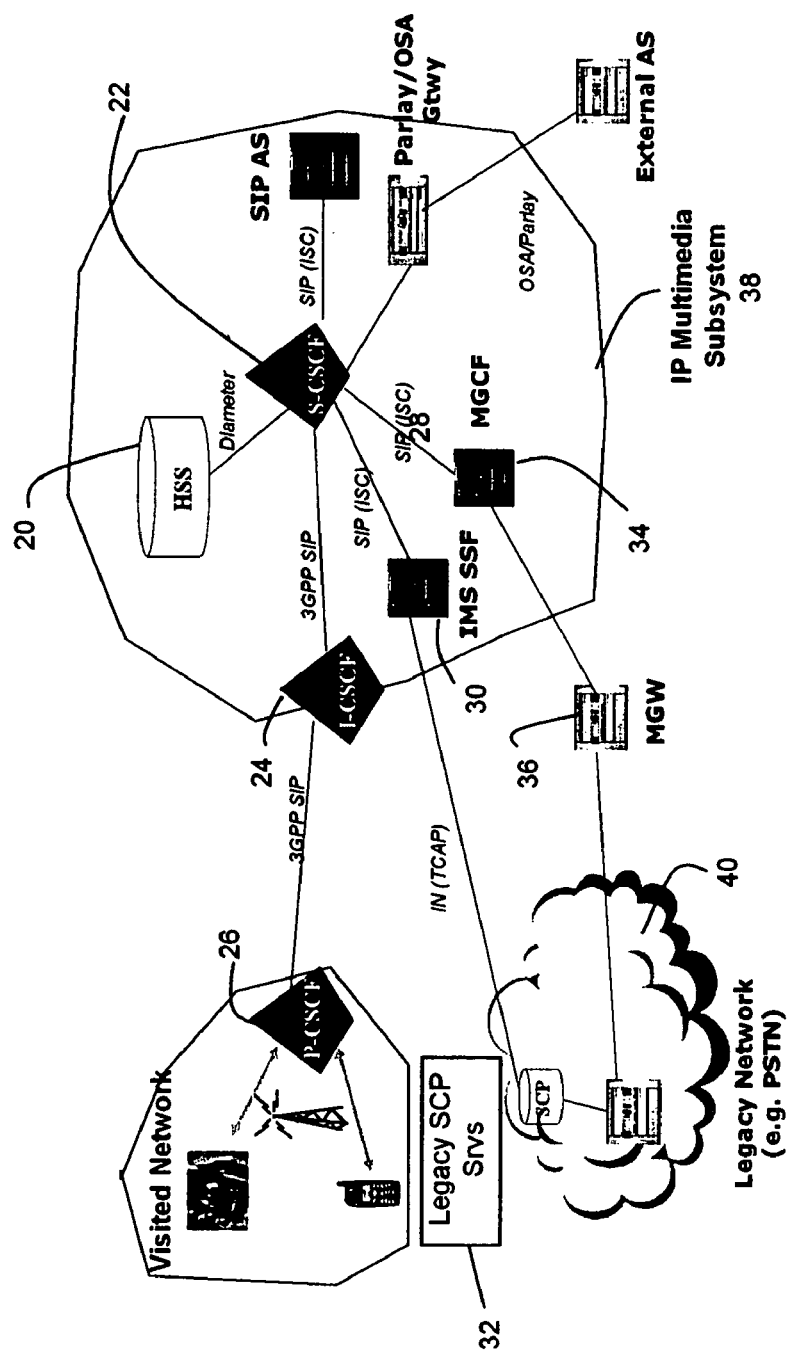
FIG. 1 is a network diagram of a SIP-based architecture for providing multimedia services.
Figure 2:
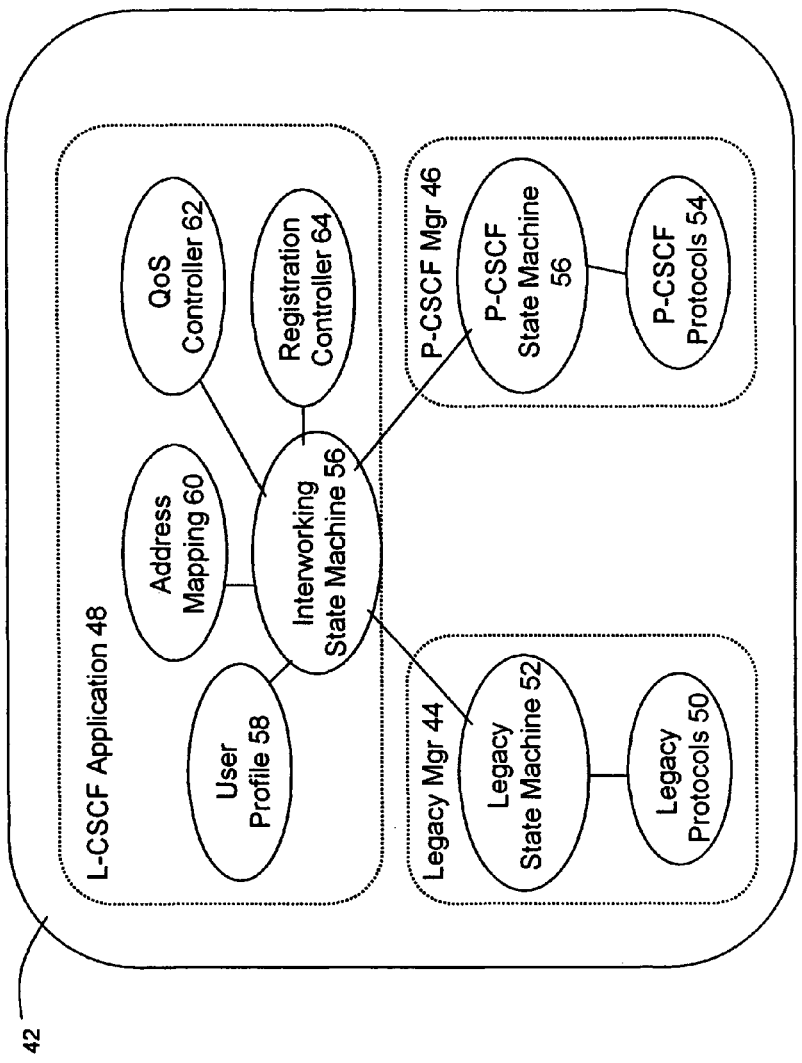
FIG. 2 is a block diagram of the L-CSCF functional architecture.

FIG. 2 illustrates the functional architecture of the Legacy User Proxy Call Session Control Function ("L-CSCF") 42. The L-CSCF Architecture includes a Legacy Manager 44, a P-CSCF Manager 46 and an L-CSCF Application 48. As will be discussed in greater detail below, this architecture can be implemented for interworking with different legacy domains including but not limited to IN and Parlay.

The Legacy Manager 44 includes protocol logic that enables the L-CSCF to interwork with a legacy network. The specific implementation of the Legacy Manager is dependent upon the specific legacy protocols supported, but will generally include both a Legacy Protocols subcomponent 50 and a Legacy State Machine subcomponent 52. The Legacy Protocols subcomponent 50 implements basic legacy protocol functions of the supported legacy protocols, such as protocol encode/decode and basic message handling capabilities. Examples of legacy protocols that may be supported by the Legacy Protocols subcomponent 50 include AIN, CAMEL, INAP, CORBA, SOAP, and HTTP. The Legacy State Machine 52 includes logic that controls the interactions with the legacy network. The logic is operative to cause the L-CSCF to appear to function as a standard legacy node from the perspective of the legacy network. For instance, in the case of an IN implementation, the Legacy State Machine could implement the core Service Control Function ("SCF") capabilities.

The P-CSCF Manager 46 implements functions which enable the L-CSCF to function as a P-CSCF from the perspective of the IMS network. A P-CSCF Protocol subcomponent 54 implements core IMS protocols such as SIP and Diameter, including the protocol encode/decode and basic message transaction processing capabilities. A P-CSCF State Machine subcomponent 56 enables the L-CSCF to appear to the IMS network as a standard P-CSCF. However, because the L-CSCF interacts with a legacy network, and not an IMS end-user, some functions supported by the P-CSCF State Machine 56 within the L-CSCF will be different than a standards-compliant P-CSCF, as will be apparent to those skilled in the art. For example, the L-CSCF need not necessarily support SIGCOMP, IPSec, and over-the-air bandwidth optimizations.

The L-CSCF Application 48 provides interworking logic for the L-CSCF 42. For example, the L-CSCF Application includes an interworking state machine 56 to enable interworking between the IMS and Legacy interfaces, and includes sufficient user and network data to enable this interworking. A User Profile subcomponent 58 includes a user profile repository such as a DB or cache containing user specific data/policies which influence the function of the L-CSCF. For example, the User Profile 58 may contain user specific data for mapping between Legacy and SIP addresses; user data which influences address translation logic, e.g., Time of Day; and user privacy policy data. The User Profile subcomponent 58 represents the runtime instance of the user data. Different options exist for persistently storing this data, including local L-CSCF databases and data download from the HSS profile. An Address Mapping subcomponent 60 implements an address translation function which allows mapping between Legacy and IMS User addresses. This function may operate on data available via the User Profile subcomponent 58. This function may also interact with external address translation systems, e.g., ENUM Server, when making address translation decisions. A QoS Controller subcomponent 62 is operative to manage Legacy Interworking Quality of Service ("QoS"). This enables the IMS network based services to influence QoS capabilities as defined in 3GPP, e.g., Go, Flow Based Charging, and to have these QoS operations mapped into appropriate Legacy functions. The supported legacy QoS functions may vary depending on the type of Legacy interfaces being supported. For example, in the IN interworking example the 3GPP QoS requests may map into IN Automatic Call Gapping (ACG) operations. The QoS controller 62 is also operative to manage system level QoS functions across both the legacy and IMS networks, e.g., to implement overload controls to ensure that a flood of IMS messages are throttled before being sent into the legacy network. A Registration Controller subcomponent 64 is operative to manage user registrations between the legacy and IMS networks. Different techniques may be employed depending on the nature of the legacy network. For example, the L-CSCF may independently register the supported legacy users. This technique most closely resembles the IMS architecture, but could be difficult to manage for large numbers of legacy users. Alternatively, legacy users could be implicitly registered within the IMS, e.g., via HSS datafill. This technique is appropriate for legacy telephone users who utilize an access technology via which they are always registered with the network. In this case, the L-CSCF only needs to manage a default registration which acts on behalf of all of the L-CSCF users. The Interworking State Machine subcomponent 56 implements the L-CSCF state machine logic. The Interworking State Machine includes the core execution logic of the L-CSCF which interacts with the other L-CSCF application components to implements its execution logic.

Figure 3:
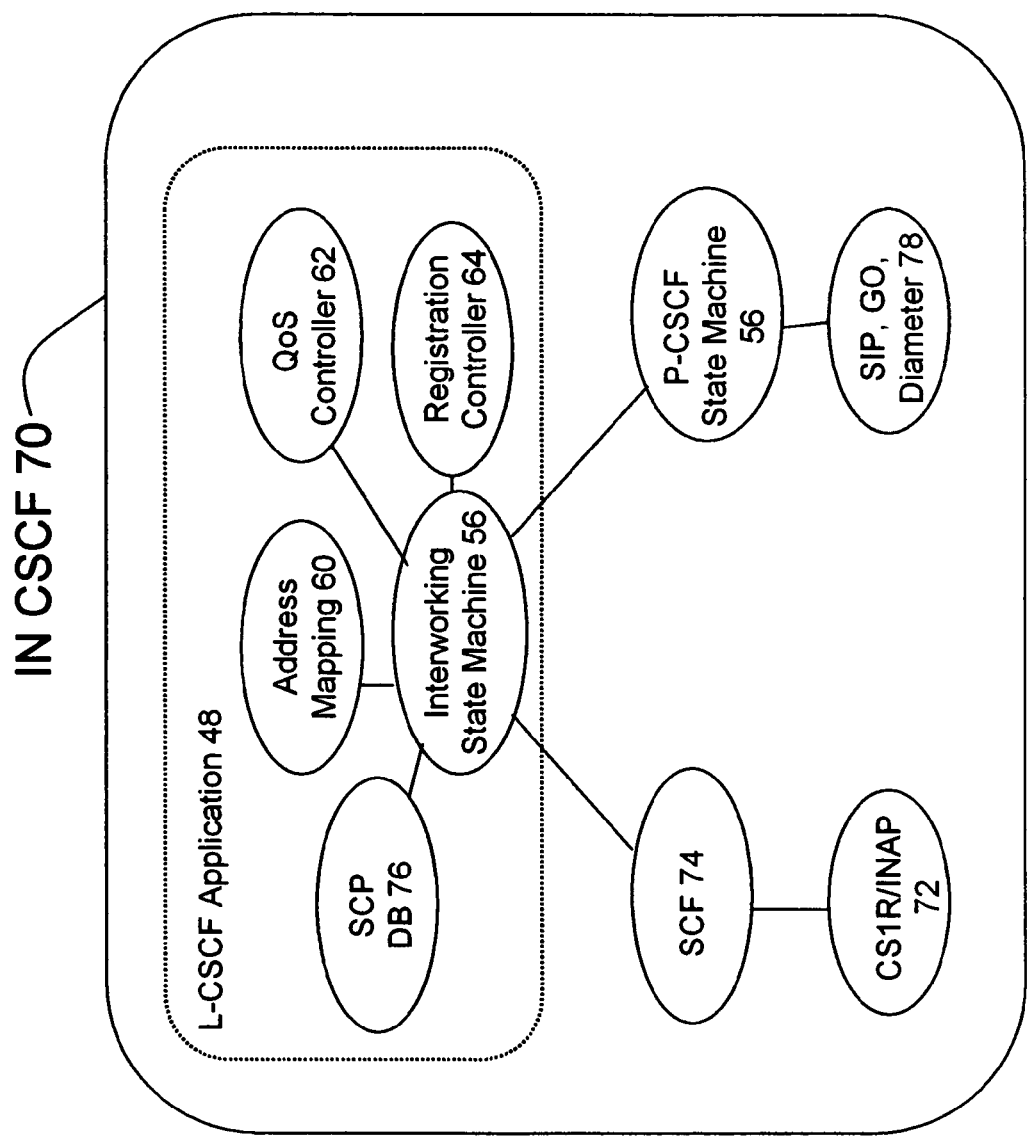
FIG. 3 is a block diagram of an IN CSCF embodiment of the L-CSCF of FIG. 2.
Figure 4:
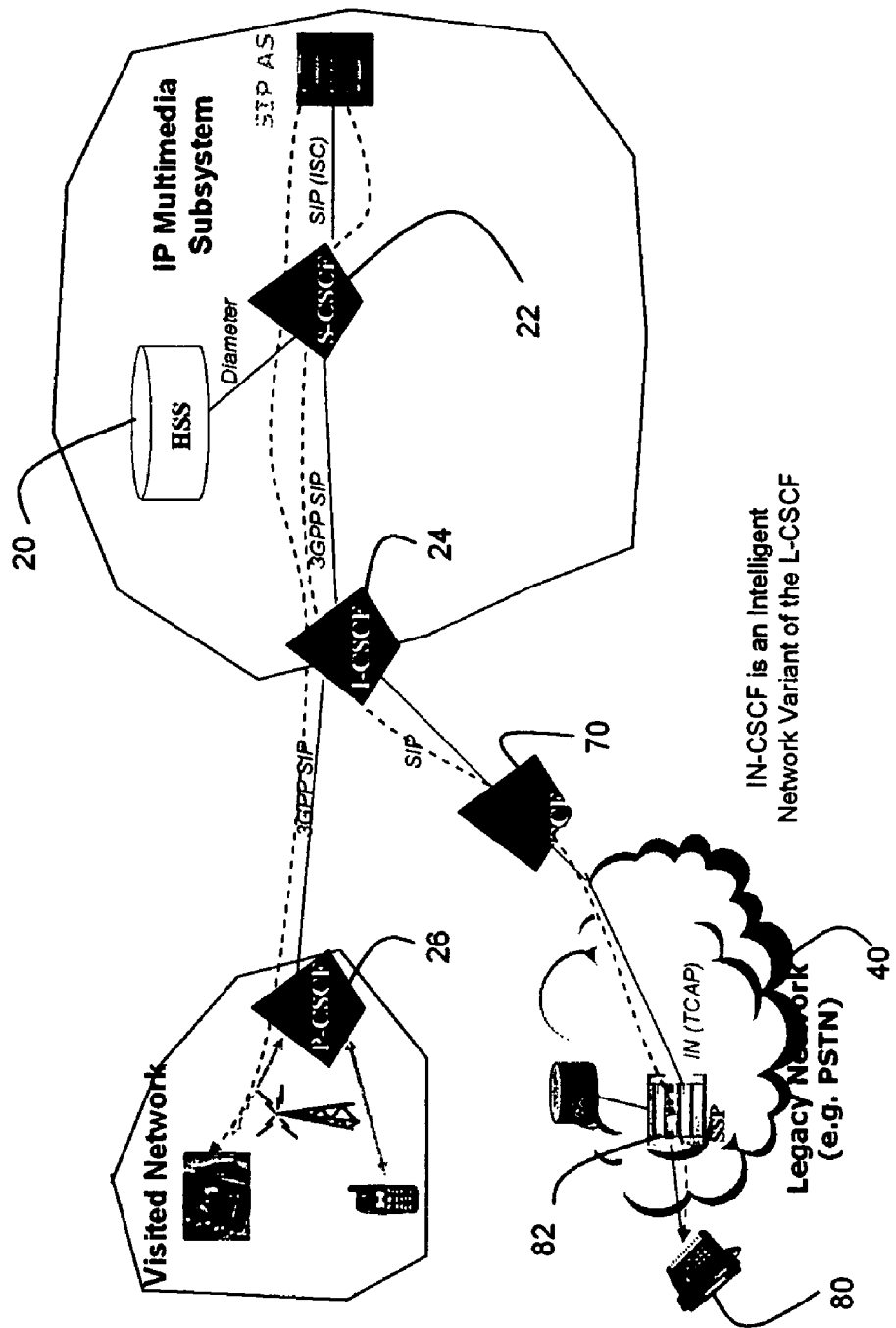
FIG. 4 is a network diagram illustrating operation of the IN-CSCF of FIG. 3 to support an IN/IMS interworking.

FIGS. 3 and 4 illustrate how the L-CSCF architecture of FIG. 2 may be utilized to provide an IN/IMS interworking L-CSCF ("IN-CSCF") 70. This embodiment includes at least some IN-specific functions. For example, a CS1R/INAP protocol subcomponent 72 is provided to implement standard wireline IN protocols. Further, a SCF subcomponent 74 is provided to implement the legacy Service Control Function ("SCF") capabilities. Further, a Service Data Function ("SDF" or "SCP DB") 76 is provided to implement the user profile functions. The P-CSCF protocols subcomponent 54 (FIG. 2) is implemented as a subcomponent 78 supporting SIP, GO and Diameter.

The IN-CSCF 70 enables a user to gain access via the legacy PSTN 40 using a standard POTS phone 80. The IN call model and corresponding triggers execute on the serving Service Switching Point (SSP) 82 and cause a IN interaction to occur between the SSP and the IN-CSCF 70. The IN-CSCF implements the appropriate IN Service Control Function (SCF) logic to manage the interaction with the SSP. The IN-CSCF also implements a standards compliant P-CSCF function, and an interworking function to map between the IN SCF state machine and transactions, and an IMS P-CSCF state machine and sessions.

From the perspective of the SSP, the IN-CSCF 70 appears to function as a standards-compliant SCP, e.g., AIN, CS-X, CAMEL, and WIN. Similarly, from the perspective of the IMS domain, the IN-CSCF appears to function as a standards-compliant P-CSCF. The SIP signaling flows from the IN-CSCF into the IMS via an I-CSCF 24, according to the standards-defined signaling mechanisms. The SIP interaction flows are handled by the user's S-CSCF 22, which utilizes the user IMS user profile (stored in the HSS 20) to determine and apply the user's subscribed services. In this way, the user is able to access the IMS service suite with a non-IMS based access type.

It will be apparent to those skilled in the art that not all services offered in the IMS domain can be provided to users using legacy devices. For example, video cannot be provided on a device without a screen. However, the IN-CSCF enables at least some services, such as media independent services, to be converged across different access types. For example, the model allows provision of IMS services comparable to those available within the legacy domain associated with the legacy device. Depending on the nature of the legacy device it may also be possible to provide additional services beyond those available within the legacy domain.

FIGS. 5, 6, 7 and 8 illustrate call flows based on interworking between the IMS and a legacy IN network using CS1R/INAP/CAP operations. It should be noted that the call flow examples show only the key messaging interactions to facilitate understanding by the reader.

Figure 5:
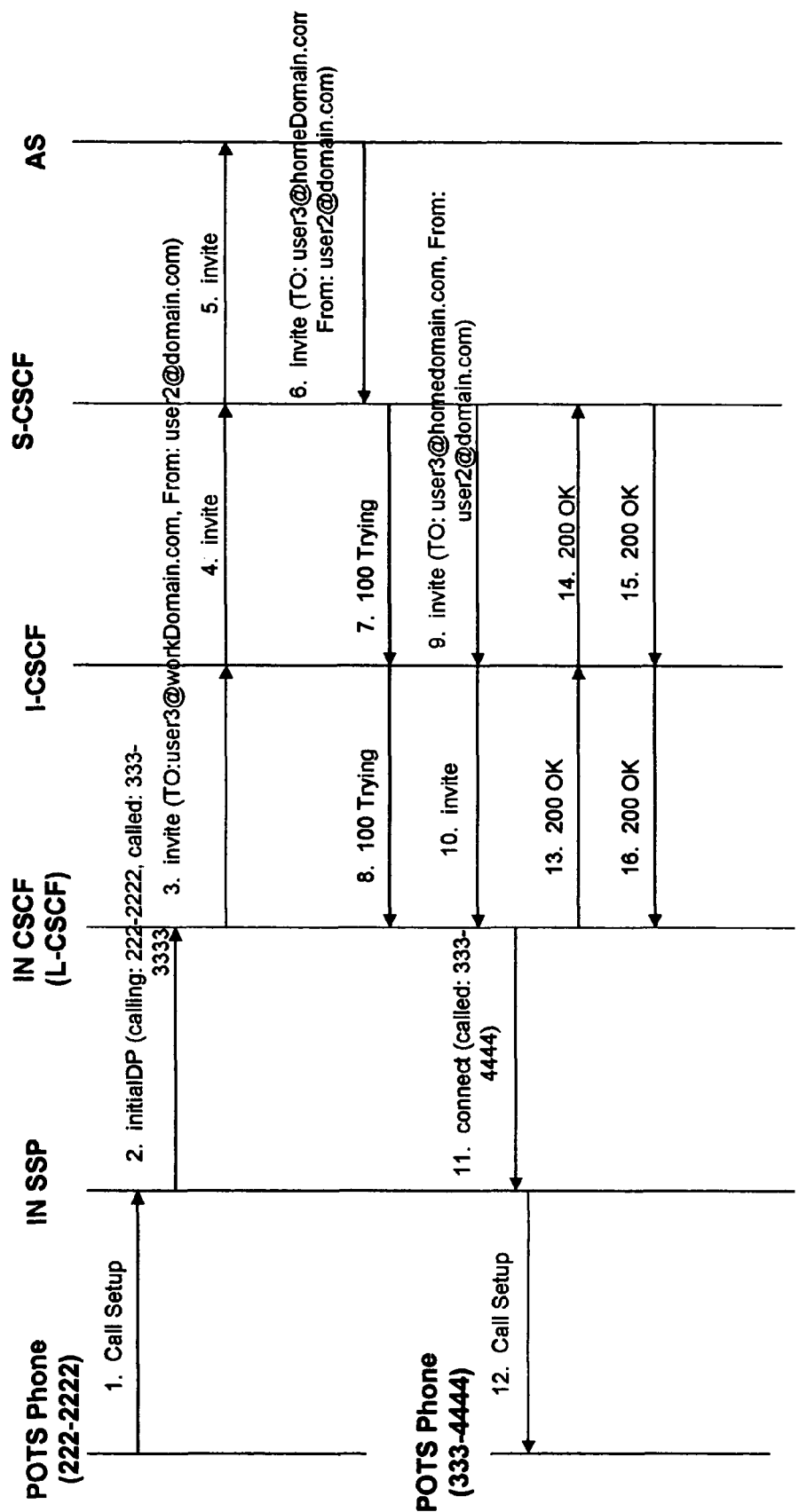
FIG. 5 is a flow diagram illustrating Call Origination (PSTN Origination, PSTN Termination).

FIG. 5 illustrates Call Origination (PSTN Origination, PSTN Termination). In step 1 a POTS User (DN: 222-2222) places a phone call to a second user (DN: 333-4444). The call setup proceeds using normal TDM voice processing capabilities, including routing of the call to the IN Service Switching Point (SSP). In step 2 the IN SSP determines that this call matches trigger criteria and initiates an IN transaction (initialDP message) with the L-CSCF. From the perspective of the SSP, the L-CSCF appears to be a typical IN SCP, with its own IN addresses, e.g., Point Code, and SS7 interfaces. In step 3 the Legacy Manager within the L-CSCF receives the initialDP message, and functions like an IN SCP. The Legacy Manager uses the User Profile and Address Mapping function to map the Calling and Called party numbers into corresponding IMS Public User Addresses. This includes a mapping of the called party (333-4444) into their corresponding IMS Work Address. These addresses are mapped into a corresponding SIP INVITE message via the P-CSCF Manager within the L-CSCF. In step 4 the INVITE message is propagated via the IMS network (using standard IMS procedures). In step 5 the S-CSCF applies service filtering rules (standard IMS procedures) and forwards the INVITE to an Application Sever ("AS") which implements the user call handling procedures such as call forwarding and personal agent. In step 6 the AS implements a personal agent service, which determines that User 3 is currently at home (not work), and modifies the INVITE message to include User 3's home IMS address. This INVITE is returned to the originating S-CSCF. In step 7 the S-CSCF generates a 100 Trying message to notify the L-CSCF that IMS processing of the request is in progress. In step 8 a 100 Trying message is sent to the L-CSCF. In step 9 the S-CSCF generates and forwards the INVITE message (from step 6) back through the IMS network to complete call setup. In step 10 the INVITE message is sent to the L-CSCF. In step 11 the L-CSCF uses the User Profile and Address Translation functions to convert user 3's IMS home address into a corresponding PSTN number (333-444), and sends an IN Connect operation to setup the call. In step 12-15 call setup continues using normal TDM procedures.

Figure 6:
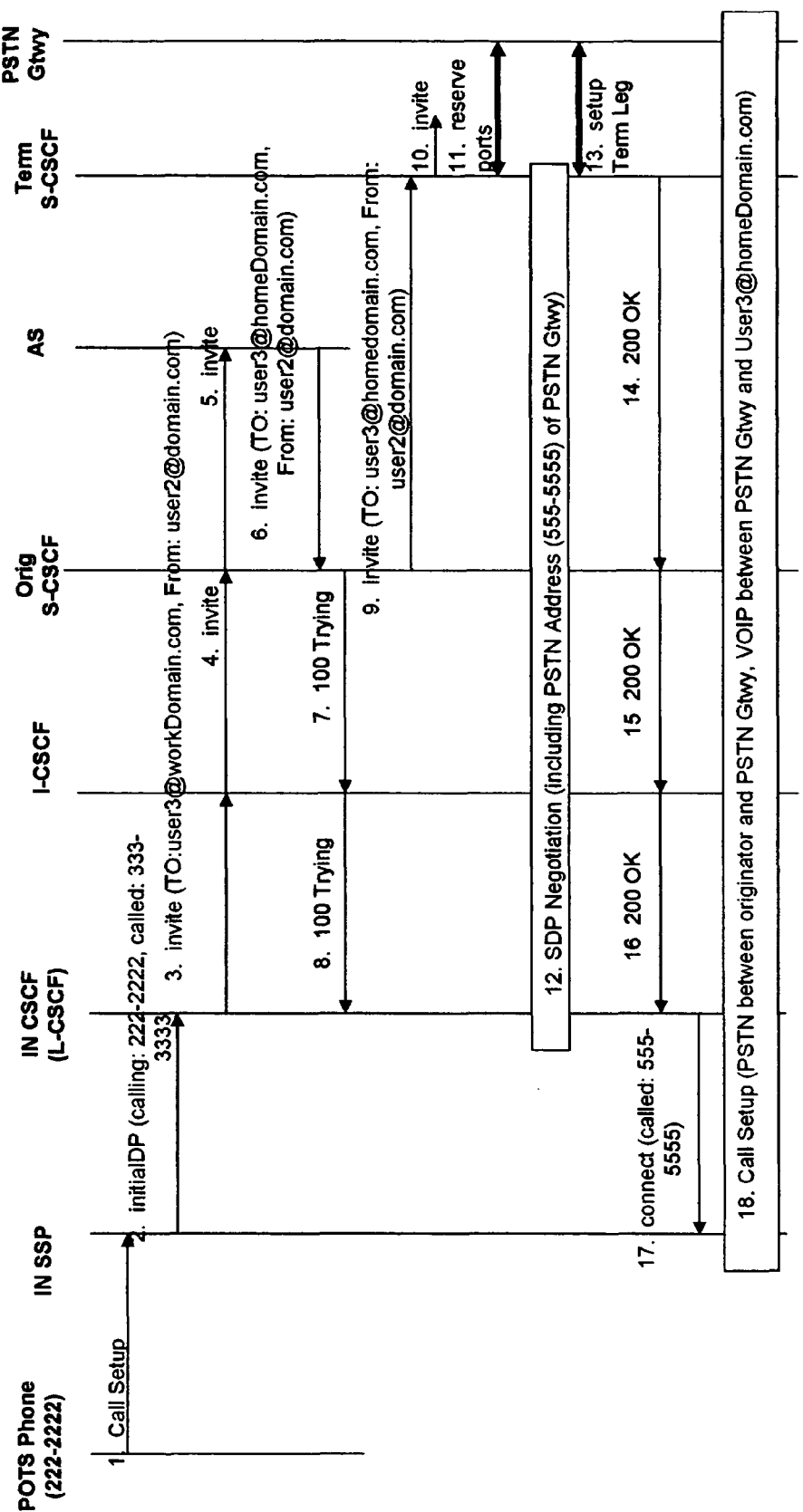
FIG. 6 is a flow diagram illustrating Call Origination (PSTN Origination, IMS Termination).

FIG. 6 illustrates Call Origination (PSTN Origination, IMS Termination). Steps 1 through 8, inclusive, are identical to the example described with regard to FIG. 5 and are not repeated here. In step 9 the originating S-CSCF determines the User 3 IMS termination is served by a different S-CSCF. Consequently, it forwards the modified INVITE message to the appropriate terminating S-CSCF (using standard IMS procedures). In step 10 the Terminating S-CSCF uses standard IMS procedures to forward the INVITE to User 3's IMS device, and to negotiate media capabilities via SDP (using standard IMS procedures). In step 11 the Terminating IMS network reserves necessary network resources (e.g. via P-CSCF and PDF). Since this call includes PSTN/IMS interworking, step 11 includes reserving a port of a PSTN/IMS interworking gateway. In step 12 the Terminating S-CSCF and the L-CSCF interact to negotiate SDP to notify the L-CSCF of the DN associated with the IMS/PSTN gateway in the terminating IMS network. In step 13 a call leg is established within the terminating IMS network. In step 14 the terminating S-CSCF sends a successful 200 OK message to the Originating S-CSCF. In step 15 a 200 OK is forwarded. In step 16 a 200 OK is forwarded. In step 16 the L-CSCF sends a Connect message back to the originating network to establish a call between the originator and the PSTN gateway that provides the interworking function for user 3's IMS termination. In steps 17-18 flow continues with normal TDM call setup procedures.

Figure 7:
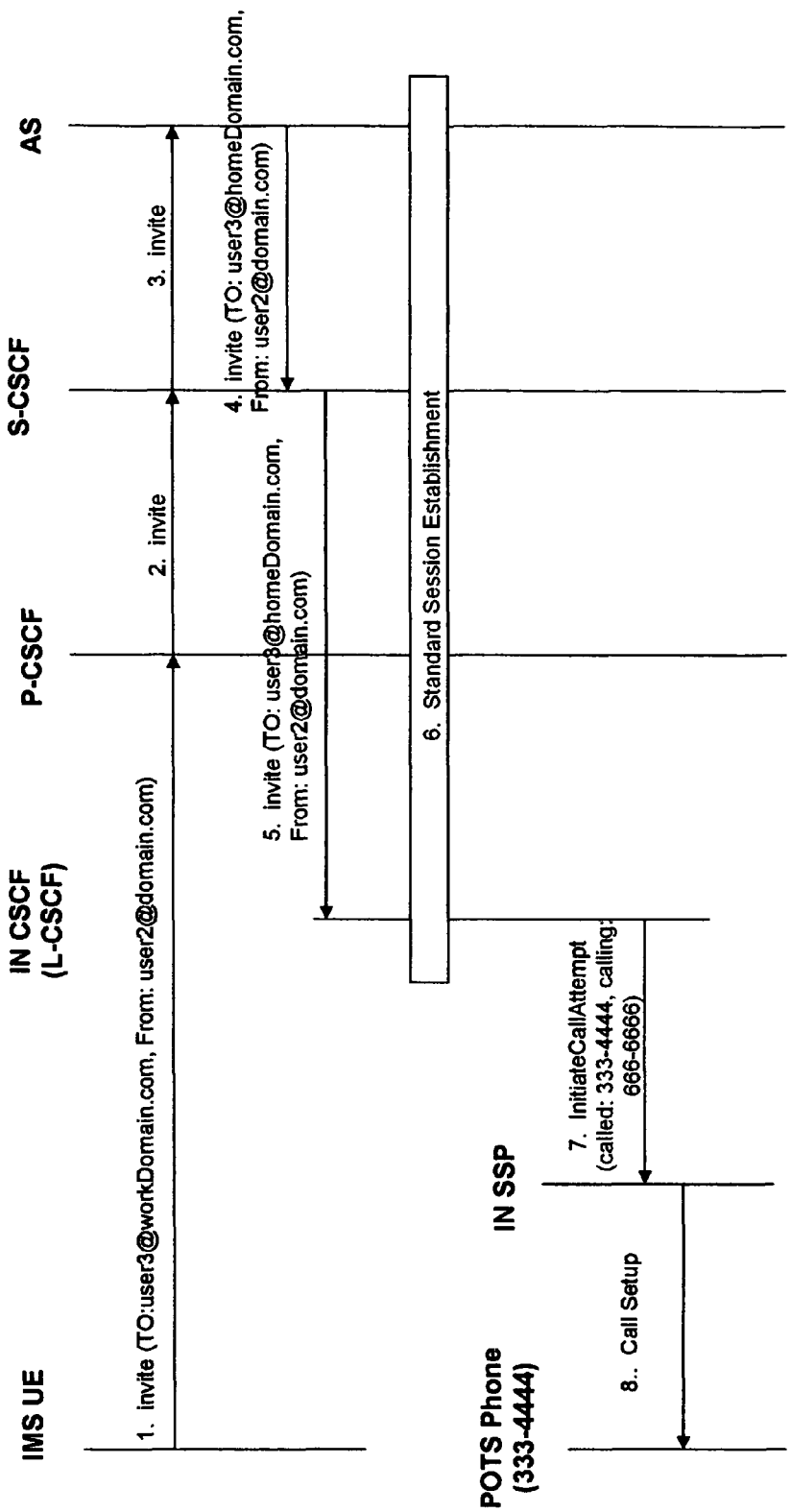
FIG. 7 is a flow diagram illustrating Call Termination (IMS Origination, PSTN Termination).

FIG. 7 illustrates Call Termination (IMS Origination, PSTN Termination). Steps 1 through 4 follow normal IMS procedures and will not be described in detail. In this example the service executing at the AS determines that User 3 is currently reachable at their home IMS address. In step 5 the S-CSCF determines that User 3's home address is reachable via the L-CSCF (e.g. based on user profile information in the S-CSCF local cache). Consequently, the S-CSCF forwards the INVITE message to the L-CSCF. In step 6 normal session establishment procedures are utilized to bring the L-CSCF into the session establishment procedure. In step 7 the L-CSCF determines (via User Profile and Address Mapping functions) that a call needs to be established between two PSTN users. Consequently, the L-CSCF sends an InitiateCallAttempt message to the IN SSP to establish this call. In step 8 the IN SSP uses normal call procedure to setup a TDM call between the two specified users.

Figure 8:
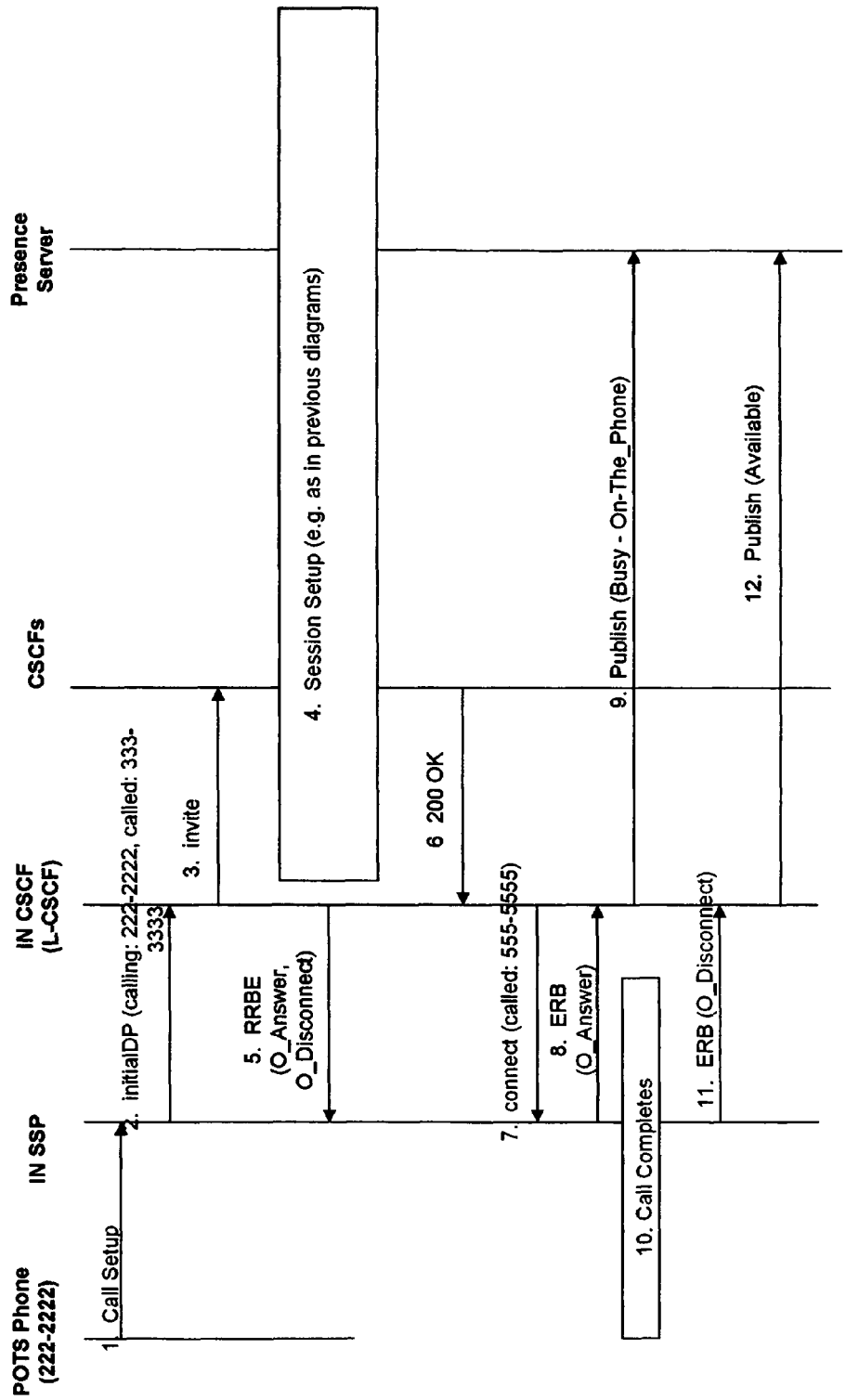
FIG. 8 is a flow diagram illustrating Presence Update (On-the-Phone), i.e., how the L-CSCF may be used to share presence information from a legacy user with other IMS users.

FIG. 8 illustrates Presence Update (On-the-Phone), i.e., how the L-CSCF may be used to share presence information from a legacy user with other IMS users. This call flow allows the IMS user to be notified when a legacy user is "on-the-phone." Steps 1, 2, 3 and 4 are identical to the previous PSTN examples and are not repeated here in detail. In step 5 the L-CSCF requests that the IN SSP provide notification when the origination user (222-2222) either answers or disconnects the call which is being established. This is achieved via an IN RequestReportBCSMEvent (RRBE) message. In step 6 the S-CSCF acknowledges successful call setup with a 200 OK message. In step 7 the L-CSCF completes the call setup request with a Connect operation, requesting the IN SSP to setup a PSTN call. In step 8 the IN SSP continues with call setup. Once the call is established, the IN SSP send an EventReportBCSM (ERB) operation to the L-CSCF to report that the originating user (222-2222) has answered the call, i.e., is currently on-the-phone. In step 9 the L-CSCF sends the on-the-phone notification to the Presence Server via the CSCF network using a standard SIP PUBLISH method. This also allows the Presence Server to report the on-the-phone presence state to other IMS users who have subscribed to receive presence notifications about user 222-2222. In step 10 the Call continues and eventually is terminated, i.e., one user hangs-up. In step 11 the IN SSP reports the Disconnect event to the L-CSCF via a ERB operation. In step 12 the L-CSCF sends the updated presence state, viz. available, to the Presence Server, thereby allowing this information to be shared with other IMS users.

In view of the above description it will be understood by those skilled in the art that the L-CSCF is not merely a IN/SIP protocol converter. The IN call models dictate a tightly coupled, transactional interaction model which does not directly map into the session oriented signaling and semantics dictated by SIP. For example, legacy mid call and event arming/reporting transactions do not have a direct mapping into a SIP session signaling. In such cases the L-CSCF is operative to handle these interworking incompatibilities in a consistent and deterministic manner. Indeed, because of the differences between the legacy and SIP state models and protocols it may not be practical to map all legacy messages into a corresponding SIP message.

Although this invention has been described as an extension to the 3GPP IMS and 3GPP2 MMD domains, it is applicable to other network services domains including but not limited to IETF SIP and HTTP. A Legacy Interworking Server may be employed to interwork between the legacy and multimedia service domains.

In view of the description above, it will be understood by those of ordinary skill in the art that modifications and variations of the described and illustrated embodiments may be made within the scope of the inventive concepts. Moreover, while the invention is described in connection with various illustrative structures, those of ordinary skill in the art will recognize that the invention may be employed with other structures. Accordingly, the invention should not be viewed as limited except by the scope and spirit of the appended claims.

What is claimed is:

1. A computer program product comprising a non-transitory computer readable medium having stored thereon program instructions which when run on a computer causes the computer to perform the steps of:
   interfacing, with a call server control function, between a first network type and a second network type to provide a user of a first network type device with access to a service of the second network type, where the service is not available within the first network, including:
      translating, with a first state machine, the service into first network type functionality using a corresponding second state machine operative to provide the service via second network type functionality;
      providing a mapping between a user address of the first network type and a corresponding second network type entry point; and
      providing a mapping between the user address and corresponding second network type authentication data.

2. The computer program product of claim 1 further including an interworking function in communication with the first and second state machines, said interworking function processing incompatibilities between a first network type call model and a second network type call model.

3. The computer program product of claim 1 further including controlling Quality of Service with a first network type Quality of Service control mechanism.

4. The computer program product of claim 1 including implementing the second network type using Session Initiation Protocol ("SIP").

5. The computer program product of claim 1 including implementing the first network type using a Public Switched Telephone Network ("PSTN").

6. A method for providing a service to a first network type device from a second network type device, where the service is not available within the first network, comprising the steps of:
   receiving a signal initiated by the first network type device;
   determining that the signal matches trigger criteria;
   mapping between a user address of the first network type and a corresponding second network type entry point;
   mapping between the user address and corresponding second network type authentication data;
   translating the signal to a corresponding second network type message using a state machine operative to provide the service via second network type functionality;
   transmitting the second network type message to the second network type device;
   receiving a response from the second network type device;
   translating the response to a corresponding first network type signal using a state machine operative to provide the service via first network type functionality; and
   transmitting the first network type response to the first network type device.

7. The method of claim 6 wherein said translating steps include the further step of processing any incompatibilities between a first network type call model and a second network type call model.

8. The method of claim 6 further including the step of configuring Quality of Service for the first network type device.

9. The method of claim 6 wherein the second network type is Session Initiation Protocol ("SIP") based.

10. The method of claim 6 wherein the first network type is Public Switched Telephone Network ("PSTN") based.

* * * * *